United States Patent [19]

Fowler et al.

[11] 4,026,751

[45] May 31, 1977

[54] METHOD AND APPARATUS FOR TEMPERATURE PROBE COVER WITH PROVISION FOR SANITARY DISPOSAL

[76] Inventors: Charles F. Fowler, 5157 Park West Ave., San Diego, Calif. 92117; Samuel G. Dawson, 1869 Hidden Mesa Road, El Cajon, Calif. 92020

[22] Filed: Feb. 23, 1976

[21] Appl. No.: 660,653

Related U.S. Application Data

[62] Division of Ser. No. 488,705, July 15, 1974, abandoned.

[52] U.S. Cl. .............................. 156/306; 73/343 R; 93/DIG. 1; 156/583; 156/581; 206/306; 206/498
[51] Int. Cl.² .......................................... C09J 5/00
[58] Field of Search .......... 156/306, 204, 581, 583, 156/227, 200, 290; 428/43, 195, 35; 128/2 H; 73/343 R, 362.3, 371; 93/DIG. 1; 219/243; 100/93 P; 206/306, 498

[56] References Cited

UNITED STATES PATENTS

| | | | |
|---|---|---|---|
| 2,343,117 | 2/1944 | Vincent | 93/DIG. 1 |
| 2,367,443 | 1/1945 | Snyder | 156/306 |
| 3,190,436 | 6/1965 | Diamant | 206/306 |
| 3,308,940 | 3/1967 | Morris | 206/498 |
| 3,552,558 | 1/1971 | Poncy | 206/498 |
| 3,809,228 | 5/1974 | Fowler et al. | 206/498 |

Primary Examiner—Charles E. Van Horn
Assistant Examiner—J. J. Gallagher
Attorney, Agent, or Firm—Brown & Martin

[57] ABSTRACT

A probe cover incorporating an inner sheath with a probe end engagement section. The section comprises a reduced width of the inner sheath adjacent the end opposite that into which the temperature probe is inserted. The reduced width section is produced by bonding of the layers of the sheath together with a graduated bond strength so that with a combination of bond separation and material stretch good contact and retention of the probe end is insured. A tapered welding head in association with a resilient platen is utilized to obtain the graduated weld section. When the temperature probe is removed after use the inner sheath is turned inside-out so that the contamination of the inner sheath is contained inside the inverted sheath and cannot contact the users hands.

4 Claims, 14 Drawing Figures

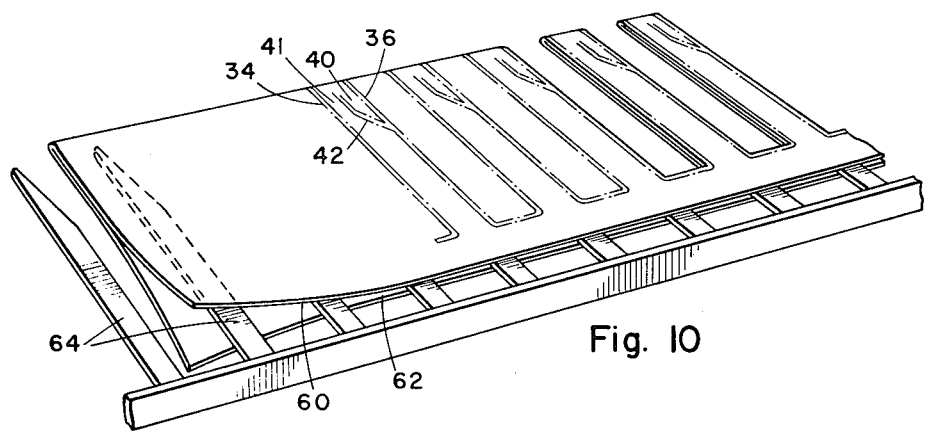
Fig. 10
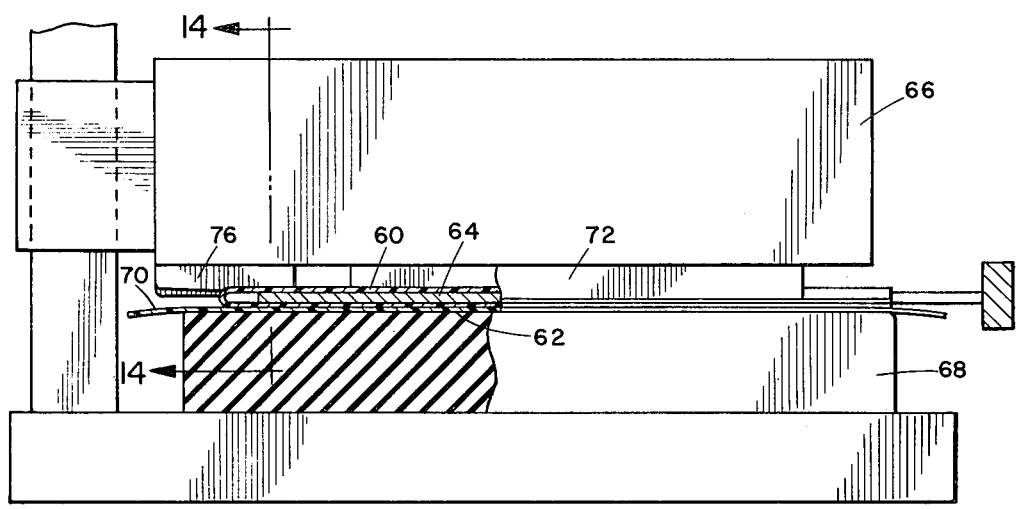
Fig. 11
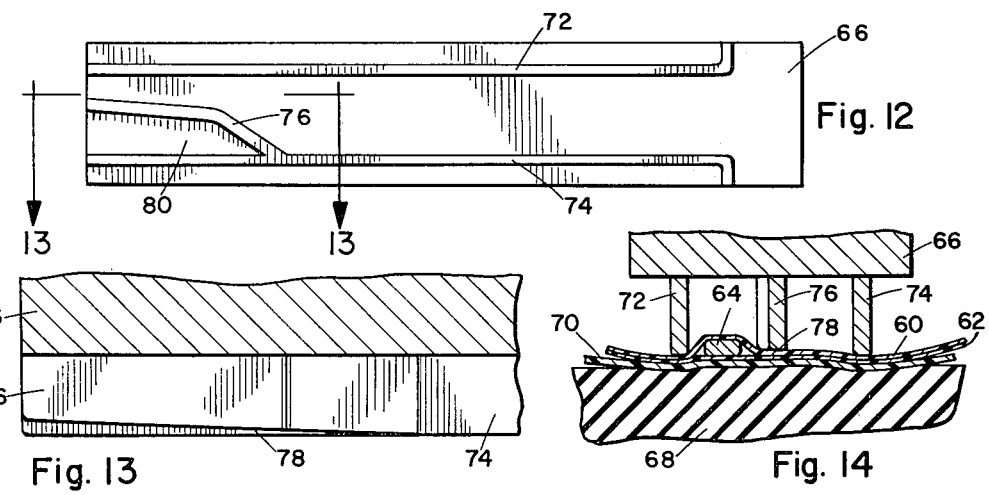
Fig. 12
Fig. 13
Fig. 14

METHOD AND APPARATUS FOR TEMPERATURE PROBE COVER WITH PROVISION FOR SANITARY DISPOSAL

This is a division of application Ser. No. 488,705, filed July 15, 1974, now abondoned.

BACKGROUND OF THE INVENTION

Various probe covers are in use for the purpose of preventing contamination when the probe is reused. These prior art probe covers normally incorporate some type of outer jacket which is at least partially removed to expose a protected inner sheath. The sheath covers the probe in use such as during insertion of a thermometer into a patients mouth. Prior art probe covers have generally utilized layers of bonded plastic strips. The strips are bonded along their longitudinal edges to produce a tubular inner sheath into which the temperature probe is received. To provide for relative ease of insertion, the tubular sheath is made of substantially a greater diameter than the largest temperature probe contemplated for use with the sheath. Such a configuration produces a relatively loose relationship between the temperature probe end and the inner sheath, such that less than a fully desirable thermal conductivity is produced in that the plastic material is not drawn tautly over the temperature probe end. Further, upon removal of the temperature probe, the sheath remains extended with its contaminated outer surface exposed. In the disposal of the probe cover then, this outer sheath may contact the user or other articles and thereby ultimately contaminate other patients.

It is therefore desirable to have a temperature probe cover that enhances the thermal conductivity between the temperature probe end and the surrounding environment, and which facilitates the sanitary disposal of the contaminated probe cover. Such a device is particularly desirable where it is adaptable to a wide range of temperature probe end sizes.

SUMMARY OF THE INVENTION

The exemplary embodiment of the invention refers to a probe cover for temperature probes, and is specifically described in association with glass and liquid thermometers. However, it is to be understood, that the principles of the invention are equally applicable to the probe covers in any application where it is desired to cover the probe with a disposable sheath of sheet material.

The specific probe cover in the examplary embodiment is described more fully in applicants previously filed patent application entitled TEMPERATURE PROBE COVER, now issued as U.S. Pat. No 3,809,228, and which patent is hereby incorporated herein in its entirety. The principles of the invention are applicable to all probe covers incorporating a tubular inner sheath, whether formed from flat sheet stock, tubular stock or otherwise.

The exemplary embodiment incorporates an elongated inner sheath formed of plastic sheet material. Two layers are utilized. The layers are sealed together along their longitudinal edges. The sensing end of the sheath is either sealed or folded over thus forming an inner sheath which is sealed on three sides. The fourth side may either be sealed with severable seal or left open. The term "openable" as used in the specification and claims is intended to cover both such configurations. The sealed inner sheath forms a tubular sheath with a width, along the major portion thereof, greater than the maximum width of the preselected temperature probes to be utilized with the probe covers. Adjacent the sensing end of the inner sheath there is provided a reduced width probe-end engagement section. The section is configured to produce a cooperative engagement between the probe, and probe end engagement section, and in the exemplary embodiment takes the form of bonding the plastic layers together to produce a restricted tubular section adjacent the sensing end. The bonded area extends across only a portion of the sensing end of the inner sheath and is tapered at an angle to the longitudinal axis of the inner sheath so that larger probe ends engage the section in advance of the point at which smaller probe ends engage the section. Thus, the capability of handling a range of probe end sizes is enhanced. The bonded area has a graduated bond strength which generally increases toward the width-wise outer edge of the tubular inner sheath. In the generally triangularly shaped bonded area incorporated in the exemplary embodiment, this width wise increase in bonded strength results in a triangular area with maximum bond strength at the apex of the triangle spaced the maximum distance from the inner sheath sensing end. The bond strength is gradually reduced along the side of the bonded area toward the sensing end. Accordingly, when the temperature probe is inserted into the inner sheath and forced into the probe end engaging section, the plastic material will begin to be drawn around the temperature probe end. The force of insertion will cause the weaker portions of the bonded area to become severed permitting adequate plastic material to admit the temperature probe end fully into the desired sensing area. When fully inserted the temperature probe end is engaged about its circumference fully by the plastic material which is stretched taut and in contact with the temperature probe end. Upon completion of the temperature sensing operation the temperature probe is drawn through an outer jacket portion adhered opposite the openable end of the inner sheath. The sensing end of the inner sheath is, by its engagement with the temperature probe end, drawn inside out such that the contaminated outer surface becomes the inner surface in a complete inversion of the inner sheath. When the temperature probe is completely withdrawn the user grasping the uncontaminated outer sheath is able to throw the temperature probe cover away without contacting the contaminated surfaces.

The bonded area of the probe end engaging section is formed with the use of a welding shoe. The welding shoe produces the weld by a combination of heat and pressure applied to one side of the outer sheath. The other side of the outer sheath is supported on a platen of resilient material such as rubber. The weld shoe has a taper, such that the portions of the bonded area which are to have the maximum strength bond are pressed with the highest pressure, and those areas which are intended to have a relatively weak bond have a minimum applied pressure.

It is therefore an object of the invention to provide a new and improved temperature probe cover with provision for sanitary disposal.

It is another object of the invention to provide a new and improved temperature probe cover which increases thermal conductivity.

It is another object of the invention to provide a new and improved temperature probe cover with capability for accomodating a wide range of temperature probe end sizes.

It is another object of this invention to provide a new and improved temperature probe cover which engages the temperature probe end firmly without danger of penetrating the sheath material.

It is another object of the invention to provide a new and improved temperature probe cover which provides for the automatic inversion of the inner sheath surfaces to protect against contamination.

It is another object of the invention to provide a new and improved temperature probe cover with a provision for sanitary disposal that does not significantly increase the unit cost.

It is another object of the invention to provide a new and improved temperature probe cover method of manufacture.

It is another object of the invention to provide a new and improved method of disposal for temperature probe covers.

Other objects and many attendant advantages of the invention will become more apparent upon a reading of the following detailed description together with the drawings in which like reference numerals refer to like parts throughout and in which:

FIG. 10 is a perspective view showing the initial steps of the forming of the inner sheath.

FIG. 11 is a side elevation view partially cut away of the apparatus for welding the bonded area of the engagement section.

FIG. 12 is an underside view of the welding head.

FIG. 13 is an enlarged sectional view taken on line 13—13 of FIG. 12.

Figure 1:
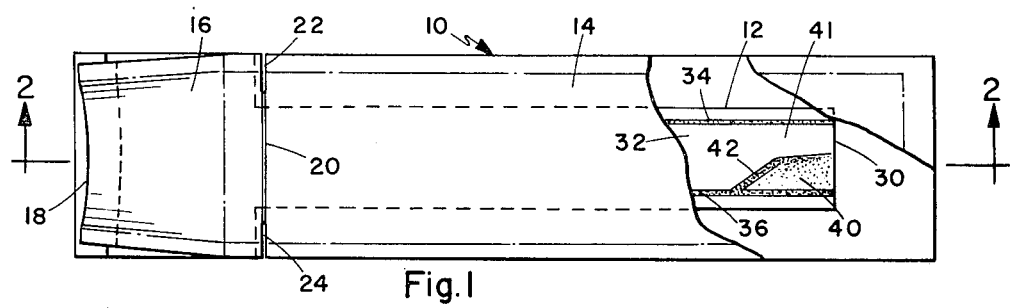
FIG. 1 is a top plan view of a complete cover, partially cut away.
Figure 2:
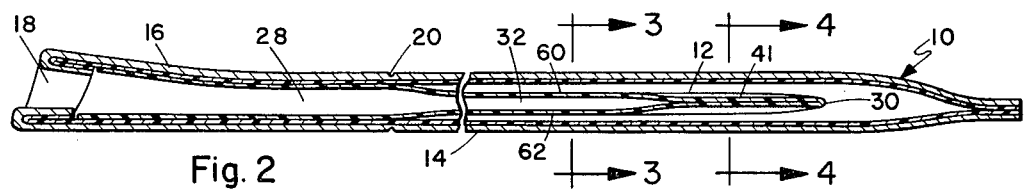
FIG. 2 is an enlarged sectional view, taken on line 2—2 of the FIG. 1.
Figure 3:
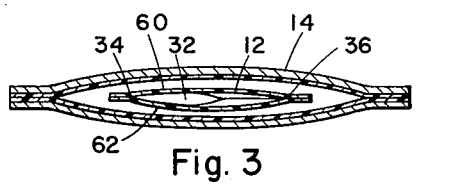
FIG. 3 is a sectional view taken on line 3—3 of FIG. 2.
Figure 4:
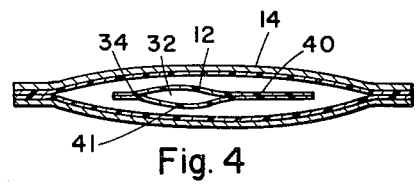
FIG. 4 is a sectional view taken on line 4—4 of FIG. 2.

FIG. 14 is an enlarged sectional view taken on line 14—14 of FIG. 1. Referring now to the drawings, there is illustrated in FIG. 1–6 a disposable temperature probe cover according to the invention. The probe cover comprises an outer jacket 10 and an inner sheath 12. The outer jacket includes a severable portion 14 and a probe insertion portion 16. Probe insertion portion 16 is formed with an opening 18 which it shares with the inner sheath 12. The outer jacket is scored along line 20 and notched at 22 and 24 so that it may be parted along line 20 to expose the inner sheath 12. The inner sheath is formed of plastic layers 60 and 62 and has an open end 28, and a closed or sensing end 30. A tubular sheath portion 32 is formed between the longitudinal seals 34 and 36. The full width of the tubular sheath portion 32 is available for insertion of a probe such as the thermometer 38 in FIG. 5. A probe end engagement section 41 comprises a reduced width of the tubular sheath portion 32 adjacent the closed or sensing end 30 formed by a bonded area 40. The bonded area 40 is generally triangular in its configuration and is defined by the bond line 36 on one edge and the bond line 42 along the opposite edge. The bond line 42 initially angles sharply toward the center of the inner sheath tubular section 32 and then tapers at a somewhat lesser angle over the remainder of its length, terminating at the closed or sensing end 30 in the inner sheath. The bond strength of the bond line 42 is graduated from a maximum at the bond line 36 to a minimum at the terminal end of the bond line 42 at the sensing end 30 of the inner sheath 12.

The layers 60 and 62 within the bond lines 36 and 40 in this embodiment are unbonded or have minimal strength bonds for purposes to be described more fully hereinafter. However, it is also possible to produce a continuous bond across the entire area 40, which bond has a bond strength that tapers from a maximum along bond line 36 to a minimum with widthwise distance from bond line 36.

Figure 5:
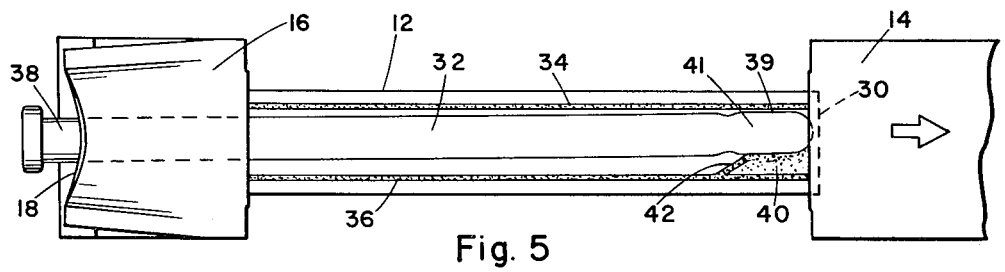
FIG. 5 is a top plan view showing the initial stripping of the outer jacket after insertion of a thermometer.

For relatively small probe end sizes such as is ilustrated for the thermometer 38 in FIG. 5, a relatively small portion of the bond line 42 is separated by the force of insertion of the temperature probe end. The plastic material is stretched taut over the temperature probe end and creates an intimate contact with the temperature probe end to maximize thermal conductivity. In the case of the insertion of a relatively large temperature probe end, such as the probe end illustrated for thermometer 46 in FIG. 7, a greater portion of the bond line 42 is parted so that the relatively large temperature probe end of the thermometer 46 is accomodated without failure of the plastic material.

Figure 6:
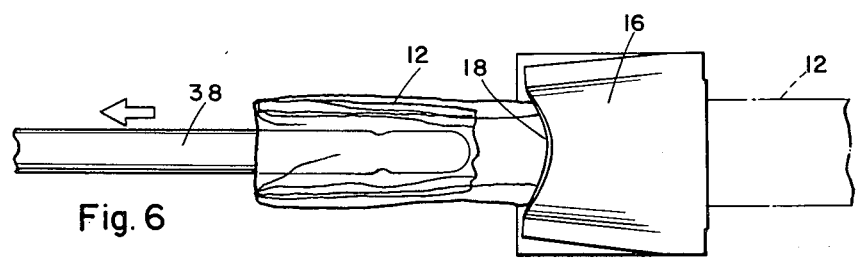
FIG. 6 illustrates the inner sheath being turned inside-out by removal of the thermometer.

The action of the probe end engagement section 41 upon withdrawal of the temperature probe 38 is illustrated in FIG. 6. The inner sheath 12 has been drawn through the outer sheath jacket insertion section 16 and is drawn inside-out, such that the contaminated outer surface of the inner sheath is the inner surface of the inverted inner sheath. The inversion continues until the inner sheath 12 is completely inside-out, and the temperature probe end is released by the engagement section. The probe cover is then discarded.

Figures 7, 8, 9:
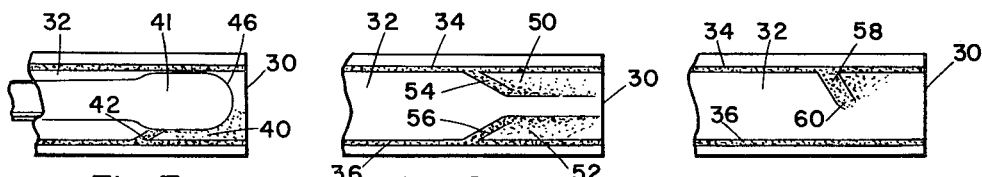
FIG. 7 is an enlarged view of the end of the inner sheath with a large bulb thermometer inserted.
FIG. 8 is a similar view showing an alternative engagement section arrangement.
FIG. 9 is a similar view of a further engagement section arrangement.

Referring now to FIGS. 8 and 9, two modified configurations for the temperature probe engagement section are illustrated. In FIG. 8 the engagement section comprises two bonded areas 50 and 52 extending from the bond lines 34 and 36. The angulated bond lines 54 and 56 have a graduated bond strength which decreases toward the closed end 30. In FIG. 9 a bond area 58 extends from the bond line 34 partially across the tubular inner sheath 32. The bond strength for the section 58 graduates from a maximum adjacent the bond line 34 to a minimum at its terminal portion 60.

Referring now to FIGS. 10–13, the method of manufacture of the improved temperature probe cover is illustrated. The plastic layers 60 and 62 are illustrated as comprising a folded portion of a single layer of sheet material. The layers are folded over guide fingers 64 on the assembly-conveyor system. Bond lines 34 and 36 and the welded section 40 are made around the guide fingers 60 so that thereafter the guide fingers serve to support the inner sheath for further processing. The bond lines, and bonded area 40 are made by a welding head 66 which applies heat and pressure to the plastic material. For this purpose the plastic material is brought over a rubber platen 68 which is protected by a teflon release sheet 70. The rubber platen 68 distributes the weld pressure evenly and translates the weld head taper into a pressure variation as will be described more fully hereinafter. The general configuration for the weld head is illustrated in FIG. 12 which shows a pressure rib 72, corresponding to the bond line 34, pressure rib 74 corresponding to the bond line 36, and pressure rib 76 corresponding to bond line 42. Rib 76 is tapered in height along its length from the point where it joins the rib 74 to its terminus. The tapered edge 78 is most apparent in the illustration in FIG. 13. FIG. 14 illustrates the effect of the taper in the bonding process. The ribs 72 and 74 are illustrated pressing the plastic layers 60 and 62 into the rubber platen 68. The rib 76 is illustrated at a section substantially mid-way along its length. Thus the rib 76 is significantly shorter than the corresponding portion of the rib 74 and 72 therefore presses the layers 60 and 62 into the platen a lesser extent. This results in a lower bonding pressure and therefore a lower bonding strength. It will be noted that the area defined by the ribs 74 and 76 includes a central area 80 with no pressure ribs. Thus little or no bonding action is developed in the corresponding area of the sheath 12. The unbonded area produces a sheath which avoids the rigidity that would result from an excessively large bonded area. Additionally, the use of two pressure ridges rather than a surface area welding head eliminates excessive head buildup, and the attendent possibility of burn through in the plastic materials.

OPERATION

In use, the nurse or other user inserts the thermometer 38 through the open end of the outer jacket 10 and inner sheath 12. The thermometer 38 passes along the inner sheath and engages the probe end engaging section 41. The bond line 42 forces the thermometer bulb 39 to one side of the inner sheath 12, in a narrowing funnel configuration, whereupon the thermometer bulb encounters a tubular width of the inner sheath that is less than the bulb dimensions. This causes a resilient stretching of the plastic and a partial permanent deformation thereof so that the plastic sheath completely conforms to the outer surface of the bulb 39. When the bulb penetration reaches a point that the plastic stretch and deformation can no longer accomodate a bulb movement, the graduated bond along the bond lines 42 begins to part making additional plastic available while maintaining an intimate contact with the bulb 39. The removable portion of the outer jacket 14 is then removed by twisting it about the part line 20 and withdrawing it as is illustrated in FIG. 5. The thermometer 38 and sheath 12 are then inserted into the patient's mouth, for example. The plastic tautness over the bulb 39 insures good thermal conductivity to produce a proper temperature reading in a minimum time. When the thermometer is removed from the patient's mouth, the nurse grasps the thermometer with one hand and the outer jacket portion 16 with the other and withdraws the thermometer in the manner illustrated in FIG. 6, causing the inner sheath to be turned inside-out such that the contaminated outer surface becomes the inner surface and none of the contaminated portion of the sheath is subject to being touched by anyone or coming in contact with other objects. The nurse then disposes of the probe cover by dropping it into appropriate disposal container, and then reads the temperature on thermometer 38.

Having described our invention, we now claim:

1. A method of manufacturing probe covers, the probe covers comprising layers of heat bondable sheet material, to obtain an elongated inner sheath with an openable end and a closed end, and having a probe end engagement section adjacent the closed end that engages the probe end during probe removal to turn said inner sheath inside out comprising the steps of:

placing layers of sheet material on a platen, pressing a welding head incorporating a heated shoe onto said sheet material and bonding said layers together to form a tubular probe cover inner sheath having a generally triangularly shaped bonded area adjacent the closed end of the inner sheath, said step of pressing said heated shoe is characterized by a pressure gradient which generally increases with widthwise distance, from the longitudinal edges of said probe cover inner sheath.

2. The method according to claim 1 wherein:
   said platen is characterized by having a rubber surface.

3. The method according to claim 1 wherein:
   said step of pressing a heated shoe is characterized by pressing a shoe that is generally tapered with respect to the distance from the plane of said layers to a minimum height above said plane at the maximum width-wise distance from the longitudinal edges of said inner sheath.

4. The method according to claim 1 wherein:
   said shoe is relieved in the portion thereof corresponding to the central area of said bonded area.

* * * * *